(12) United States Patent
Booth et al.

(10) Patent No.: US 8,648,511 B2
(45) Date of Patent: Feb. 11, 2014

(54) MAGNETIC COMPONENT PART FOR A ROTOR ASSEMBLY

(75) Inventors: James Kenneth Booth, Brande (DK); Soeren Gundtoft, Fredericia (DK)

(73) Assignee: Siemens Aktiengesellschaft, Munich (DE)

( * ) Notice: Subject to any disclaimer, the term of this patent is extended or adjusted under 35 U.S.C. 154(b) by 504 days.

(21) Appl. No.: 13/010,128

(22) Filed: Jan. 20, 2011

(65) Prior Publication Data

US 2011/0175480 A1    Jul. 21, 2011

(30) Foreign Application Priority Data

Jan. 20, 2010 (EP) .................................. 10000541

(51) Int. Cl.
*H02K 1/27* (2006.01)
*H02K 15/03* (2006.01)

(52) U.S. Cl.
USPC ............ 310/156.13; 310/156.21; 310/156.25; 310/156.38; 310/156.47

(58) Field of Classification Search
USPC ............ 310/156.01, 156.13, 156.25, 156.38, 310/156.47; 13/156.01, 156.13, 156.25, 13/156.38, 156.47
See application file for complete search history.

(56) References Cited

U.S. PATENT DOCUMENTS

| 5,302,876 A * | 4/1994 | Iwamatsu et al. ........ 310/156.12 |
| 6,867,524 B2 | 3/2005 | Liang |
| 7,030,529 B2 * | 4/2006 | Dommsch et al. ....... 310/156.22 |
| 2008/0036215 A1 | 2/2008 | Gizaw et al. |
| 2011/0248592 A1 * | 10/2011 | Siegfriedsen ............ 310/156.08 |

FOREIGN PATENT DOCUMENTS

| DE | 10 2005 042543 | * 3/2007 | .............. H02K 1/22 |
| DE | 10 2008 063045 | * 7/2010 | .............. H02K 1/28 |
| EP | 1 860 755 A2 | 11/2007 | |
| JP | 2004180491 A | 6/2004 | |
| WO | WO 2005/093928 A1 | 10/2005 | |

\* cited by examiner

*Primary Examiner* — Burton Mullins

(57) ABSTRACT

A magnetic component part for a rotor assembly of an electromechanical transducer is provided. The magnetic component part includes a base element having a first side and an opposing second side, a permanent magnet, attached to the base element at the first side, and a mounting structure fixed to the base element at the second side and adapted to be mechanically connected to a support structure of the rotor assembly. The permanent magnet is located in an offset position with respect to a central axis of the mounting structure, which central axis extends from the mounting structure through the second side to the first side. A rotor assembly, an electromechanical transducer and a wind turbine, which are all equipped with at least four magnetic component parts are also provided as well as a method for manufacturing a rotor assembly including at least four magnetic component parts.

16 Claims, 4 Drawing Sheets

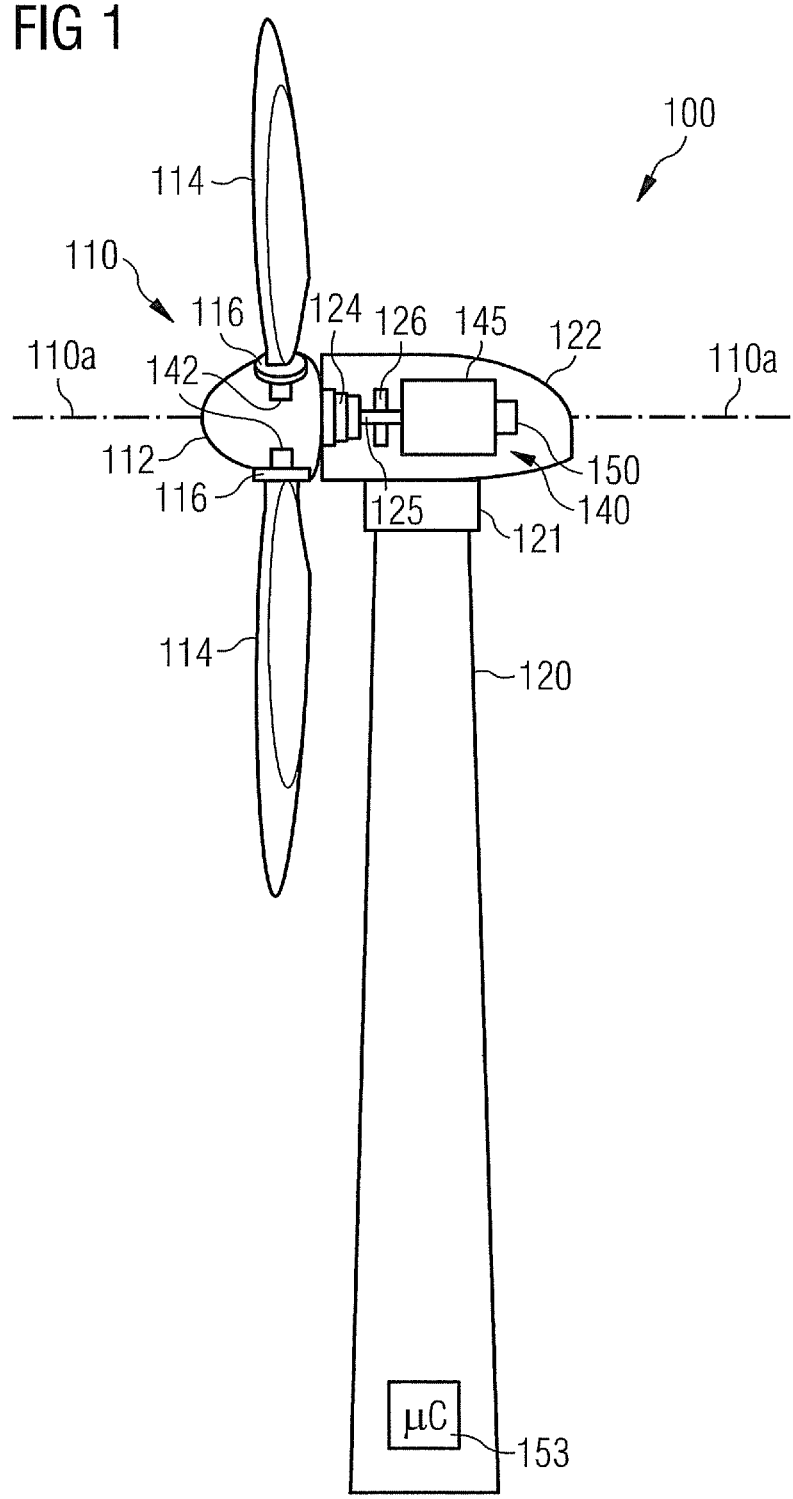

FIG 2A
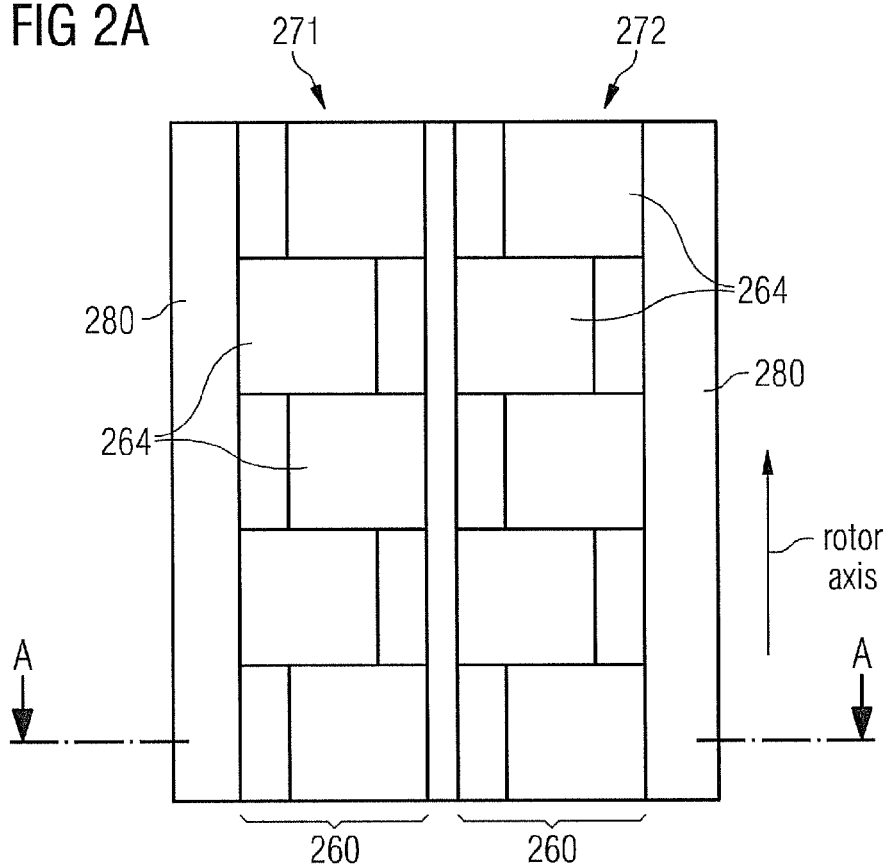
rotor axis
FIG 2B  A-A
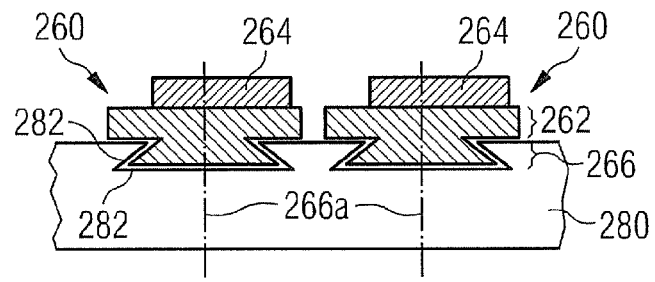
FIG 2C
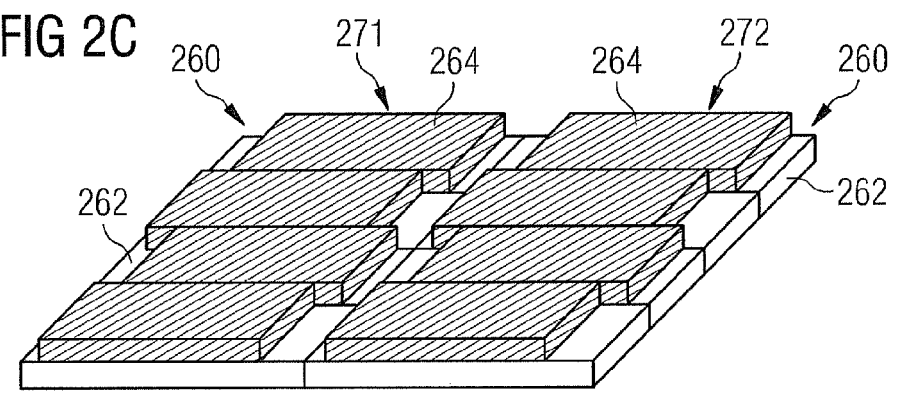

FIG 3A
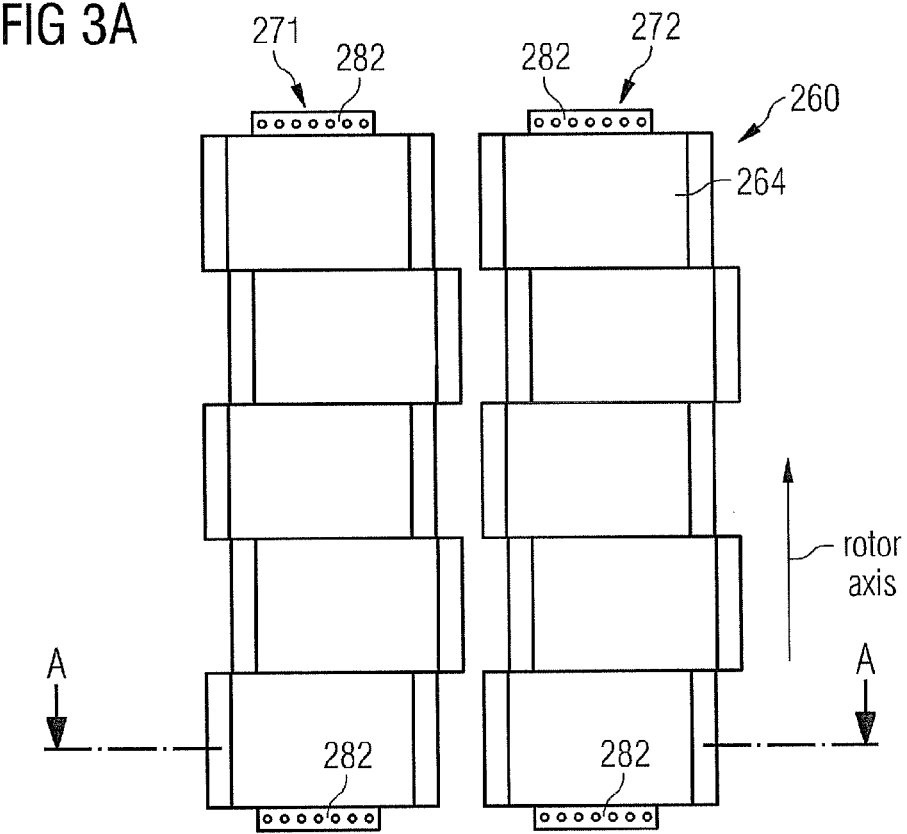
rotor axis
FIG 3B  A-A
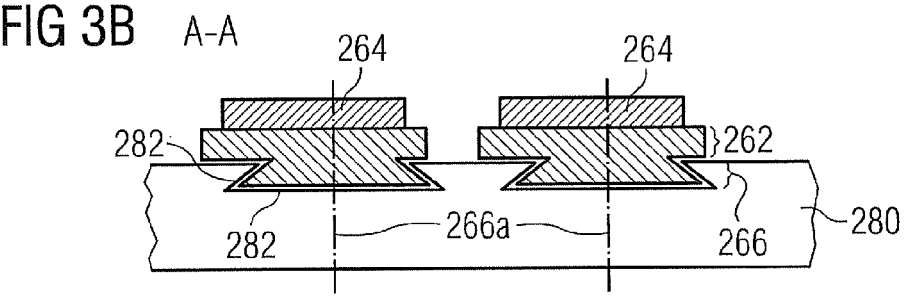
FIG 3C
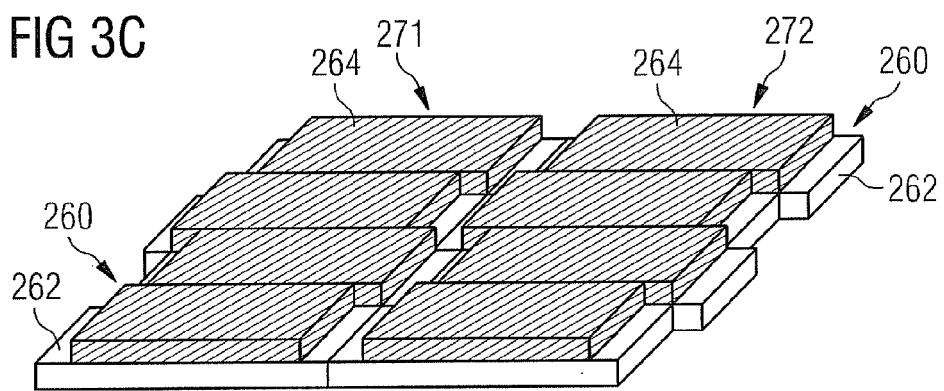

MAGNETIC COMPONENT PART FOR A ROTOR ASSEMBLY

CROSS REFERENCE TO RELATED APPLICATIONS

This application claims priority of European Patent Office application No. 10000541.2 EP filed Jan. 20, 2010, which is incorporated by reference herein in its entirety.

FIELD OF INVENTION

The present invention relates to the technical field of electromechanical transducers having a rotor which comprises permanent magnets. In particular, the present invention relates to a magnetic component part for a rotor assembly of an electromechanical transducer. Further, the present invention relates to a rotor assembly, to an electromechanical transducer and to a wind turbine, which are all equipped with at least four of such magnetic component parts. Furthermore, the present invention relates to a method for manufacturing a rotor assembly of an electromechanical transducer, wherein the rotor assembly comprises at least four of such magnetic component parts.

ART BACKGROUND

Electromechanical transducers are machines, which convert electrical energy into mechanical energy or vice versa. An electric motor is a widely used electromechanical transducer that converts electrical energy into mechanical energy using magnetic field linkage. An electric generator is an electromechanical transducer that converts mechanical energy into electrical energy also using a magnetic field linkage.

An electromechanical transducer comprises a stator and a rotor. The stator is an assembly, which represents the stationary part of an electromechanical transducer. The rotor is an assembly, which represents the moving part of an electromechanical transducer.

In order to realize a magnetic field linkage permanent magnets may be used in particular for a rotor of an electromechanical transducer. In recent years, especially since the introduction of rare-earth magnetic materials, permanent magnet (PM) electromechanical transducers have become popular since they eliminate the need for commutators and brushes, which are commonly used with conventional Direct Current (DC) electromechanical transducer. The absence of an external electrical rotor excitation eliminates losses on the rotor and makes permanent magnet electromechanical transducers more efficient. Further, the brushless design of a PM electromechanical transducer allows conductor coils to be located exclusively in the stationary stator. In this respect it is mentioned that non-PM electromechanical transducers, which are equipped with commutators and brushes, are susceptible to significantly higher maintenance costs.

PM electromechanical transducers are also known for their durability, controllability, and absence of electrical sparking. Thanks to their advantages the PM electromechanical transducers are widely used in many applications such as electric vehicles (electromechanical transducer is a motor) or in power generation systems (electromechanical transducer is a generator) such as for instance a wind turbine.

One technical problem of PM electromechanical transducers is cogging torque. Cogging torque is produced between the rotor mounted permanent magnets and the stator due to a meeting of "sharp edges" of the rotor magnets and stator coils when the PM electromechanical transducer is in operation. Cogging torque is an undesired effect that contributes to an output ripple (also called torque ripple), to vibrations, and to noise in an electromechanical transducer.

It is known that skewing of the rotor magnets can reduce or nearly eliminate cogging torque in permanent magnet generators. For instance U.S. Pat. No. 6,867,524 B2 discloses a permanent magnet motor comprising a rotor having at least three segments. Each of the three segments is formed sequentially adjacent and aligned along an axis of the rotor. Each segment has at least one pair of permanent magnets disposed at a substantially equal interval in a peripheral direction of the rotor. First and second segments are skewed relative to each other by a first angular displacement, and the first and third segments are skewed relative to each other by a second angular displacement. The first and second angular displacements are selected to cause a net sum of torque ripple produced by each of the segments to be substantially equal to zero during an operation of the motor.

However, correct mounting, alignment and skewing of the permanent magnets at the rotor assembly are difficult and time consuming. Therefore, there may be a need for facilitating mounting, alignment and skewing of permanent magnets to a rotor assembly of an electromechanical transducer.

SUMMARY OF THE INVENTION

This need may be met by the subject matter according to the independent claims. Advantageous embodiments of the present invention are described by the dependent claims.

According to a first aspect of the invention there is provided a magnetic component part for a rotor assembly of an electromechanical transducer. The provided magnetic component part comprises (a) a base element having a first side and an opposing second side, (b) a permanent magnet, which is attached to the base element at the first side, and (c) a mounting structure, which is fixed to the base element at the second side and which is adapted to be mechanically connected to a support structure of the rotor assembly. The permanent magnet is located in an offset position with respect to a central axis of the mounting structure, which central axis extends from the mounting structure through the second side to the first side.

The described magnetic component part is based on the idea that an alternating skewing of permanent magnets in an axial direction of a rotor assembly of an electromechanical transducer can be obtained simply by combining a number of one and the same type of magnetic component parts behind each other in the axial direction. Thereby, the skewing can be obtained by rotating each magnetic component part by 180 deg compared to the neighbouring magnetic component parts. Due to the described offset between the permanent magnet and the mounting structure the position of the permanent magnets changes in an alternating manner in the axial direction of the rotor.

The feature that the permanent magnet is located in an offset position with respect to a central axis of the mounting structure may mean that the permanent magnet and the mounting structure are not aligned with respect to the central axis of the mounting structure. This includes two possibilities: (A) the central axis of the mounting structure bypasses the permanent magnet and (B) the central axis of the mounting structure runs through the permanent magnet. In the latter case (B) of course the central axis of the mounting structure does not run through a central point of the permanent magnet. In this respect the central point of the permanent magnet may be defined for instance by the center of gravity and/or by a center of a surface area of the permanent magnet. In the latter case the surface area may be assigned in particular to a surface of the permanent magnet, which surface is oriented towards the base element and/or to a surface of the permanent magnet, which surface is directed away from the base element.

In other words, by using the described magnetic component part it is possible to skew the rotor magnets simply by combining a number of magnetic component parts behind each other in an alternating manner (along the axial direction of the rotor), whereby the orientation of one magnetic component part is skewed or screwed by 180 deg with respect to its neighboring magnetic component parts. This means that the skewing is realized by combining the magnetic component parts in an appropriate manner and not by using different magnet size and shapes that are mounted directly on to the support structure of the rotor assembly.

A rotor (assembly) comprising skewed permanent magnets can be assembled by using only one and the same type of magnetic component parts at least for one axial row of the rotor. Thereby, the complexity of the rotor can be reduced compared to existing solutions where different shapes and sizes of the magnets are used in order to obtain a skewing.

In this respect it is mentioned that a rotor may be preferably assembled with two types of magnetic component parts, which types have the same geometrical shape and which differ from each other only by the orientation of the respective permanent magnet. Thereby, a first type of magnetic component part may comprise a permanent magnet, wherein a south pole of the permanent magnet is adjoining the first side of the base element and the north pole of the permanent magnet is directed away from the first side of the base element. Accordingly, the second type of magnetic component part may comprise a permanent magnet, wherein a north pole of the respective permanent magnet is adjoining the first side of the base element and the south pole of the respective permanent magnet is directed away from the first side of the base element.

The described use of a base element makes it possible to fasten each permanent magnet to the base element in advance and in an automated manner before an assembling of the rotor is carried out. This makes the manufacturing process for a rotor assembly having skewed permanent magnets very effective.

It is mentioned that the mounting structure may comprise any mechanical fastening means which allow for a mechanical connection with the support structure of the rotor assembly. Thereby, the fastening means of the mounting structure and fastening means of the support structure may be complementary with respect to each other. Specifically, the fastening means of the mounting structure and/or the fastening means of the support structure may comprise a screw, a bolt, a nut, an inside or an outside thread, a clamping element, a split pin or any other element which allows for a mechanical fastening between the mounting structure and the support structure.

It is pointed out that the mounting structure may comprise any contour which extends from the base element and/or which is formed as a recess within the base element. Specifically, the mounting structure may be a protrusion and/or a recess.

According to an embodiment of the invention the base element is a base plate, the first side is a first surface of the base plate and the second side is a second surface of the base plate. This may provide the advantage that a permanent magnet, which usually has a planar surface, can be attached easily to the base element.

Further, by using a base plate the base element can have a flat design, such that the magnetic component part can be realized within a compact and in particular within a flat configuration. This may provide the advantage that when using the described magnetic component parts the diameter of a corresponding rotor assembly will be only marginally larger than the diameter of a conventional rotor assembly, which however involves a much larger effort for appropriately skewing the permanent magnets.

According to a further embodiment of the invention the magnetic component part further comprises a glue, which is located at a boundary surface between the base element and the permanent magnet. This may mean that the fastening of the permanent magnet to the base element is realized by gluing.

In view of a typical large brittleness of magnetic materials attaching the permanent magnet to the base element may be preferable in particular over other fastening mechanisms such as using screws and/or bolts. By using an appropriate glue material the risk for damaging the permanent magnet when attaching the same to the base element may be kept very small.

According to a further embodiment of the invention the mounting structure is integrally formed with the base element. This may provide the advantage that for manufacturing the described magnetic component part it is not necessary to attach or to fix the mounting structure to the base element.

According to a further embodiment of the invention the mounting structure comprises a contour, which is adapted to engage with a complementary contour of the support structure. This may provide the advantage that the mounting structure and the support structure can be mechanically connected to each other in a reliable manner without using any specific tools such as a screwdriver or a spanner.

Specifically, when manufacturing the rotor assembly the magnetic component parts may be inserted into a groove or put onto a protrusion of a central shaft of the rotor assembly in a slidable manner, wherein the groove or the protrusion extend in the longitudinal axial direction of the central shaft.

According to a further embodiment of the invention the contour and/or the complementary contour is formed in a dove tail manner. This may provide the advantage that the magnetic component parts can be aligned correctly with the support structure. Further, a dove tail shape or any similar geometric faun may ensure a mechanically reliable fastening of the magnetic component part with the support structure of the rotor assembly.

According to a further embodiment of the invention the permanent magnet comprises the shape of a parallelepiped and in particular the shape of a right parallelepiped. This may mean that the permanent magnet has a lower surface (which is adjoining the base element or the glue) which has the shape of a parallelogram or a rhombus. The same may hold for an upper surface of the permanent magnet, which upper surface is directed away from the first side of the base element.

In case of a right parallelepiped the side surfaces abut to the lower and the upper surface in a right angle. Therefore, a right parallelepiped may provide the advantage that the permanent magnet can be produced easily or even saleable permanent magnets can be used. In view of a typically brittleness of magnetic materials this is an advantage which should not be underestimated.

When arranging the described magnetic component parts in two rows, wherein the magnetic component parts are positioned in an alternating (180 deg) manner as described above, one could realize an even further smoothing out of the cogging torque. Further, by appropriately spacing the two rows apart, wherein the permanent magnets of one row have their north pole on the upper side and the permanent magnets of the other row have their south pole on the upper side, a duct can be formed in between the two rows. This duct may provide a channel for a flow of air such that a beneficial cooling effect may be achieved.

In this respect it is mentioned that for realizing a continuous side surface of a plurality of permanent magnets, which are each formed in the shape of a (right) parallelepiped, there may be required two types of magnetic component parts, which have to be arranged in the respective row in an alternating manner. Thereby, one type of magnetic component part comprises a permanent magnet, which in a top view is inclined to the right (seen from a first row end to a second row end) and the other type of magnetic component part comprises a permanent magnet, which in a top view is inclined to the left (seen from the first row end to the second row).

According to a further aspect of the invention there is provided a rotor assembly for an electromechanical transducer. The provided rotor assembly comprises (a) a rotor shaft having a longitudinal axis, (b) a first row of magnetic component parts as described above, wherein the first row is aligned with the longitudinal axis and wherein the magnetic component parts of the first row are arranged in an alternating orientation such that neighboring permanent magnets of the first row are skewed which respect to each other, and (c) a second row of magnetic component parts as described above, wherein the second row is aligned with the longitudinal axis and wherein the magnetic component parts of the second row are arranged in an alternating orientation such that neighboring permanent magnets of the second row are skewed which respect to each other.

The described rotor assembly is based on the idea that by using exclusively the magnetic component parts as described above a skewing of neighboring permanent magnets in the longitudinal direction of the rotor shaft respectively of the rotor can be realized effectively. Thereby, during assembling the rotor (assembly) the skewing may be obtained by rotating each magnetic component part by 180 deg compared to the neighbouring magnetic component parts within the same row.

For realizing the described permanent magnet skewing it is of course necessary that each row comprises at least two magnetic component parts. With respect to the maximum number of magnetic component parts, which are comprised in one row, there is no principal limitation. The concrete number of magnetic component parts, which are used for one row, may depend on specific requirements and can be adapted easily to the specific implementation.

According to an embodiment of the invention the first row and the second row are spaced apart from each other in such a manner, that in between the first row and the second row a channel is formed. The channel may be a duct for air or for any other fluid, which is capable of streaming through the whole magnet assembly. The air and/or the other fluid may be used for cooling the rotor assembly.

It is mentioned that a smooth geometry for the described channel may be realized when the permanent magnets each comprise the shape of a parallelepiped as described above.

According to a further aspect of the invention there is provided an electromechanical transducer comprising (a) a stator assembly and (b) a rotor assembly as described above.

The provided electromechanical transducer is based on the idea that with the above described rotor assembly comprising skewed permanent magnets an output ripple caused by cogging torque can be significantly reduced.

According to an embodiment of the invention the electromechanical transducer is a generator.

According to a further aspect of the invention there is provided a wind turbine for generating electrical power. The provided wind turbine comprises (a) a tower, (b) a rotor, which is arranged at a top portion of the tower and which comprises at least one blade, and (c) an electromechanical transducer as described above, wherein the electromechanical transducer is mechanically coupled with the rotor.

According to a further aspect of the invention there is provided a method for manufacturing a rotor assembly of an electromechanical transducer. The provided method comprises mounting at least four magnetic component part as described above to a mounting structure of the rotor assembly. Thereby, at least two magnetic component parts are assigned to a first row being aligned with a longitudinal axis of the rotor assembly, whereby the magnetic component parts of the first row are arranged in an alternating orientation such that neighboring permanent magnets of the first row are skewed which respect to each other. Further, at least two magnetic component parts are assigned to a second row being aligned with a longitudinal axis of the rotor assembly, whereby the magnetic component parts of the second row are arranged in an alternating orientation such that neighboring permanent magnets of the second row are skewed which respect to each other.

Also the described rotor assembly manufacturing method is based on the idea that by using exclusively the magnetic component parts as described above a skewing of neighboring permanent magnets in the longitudinal direction of the rotor shaft respectively of the rotor can be realized effectively. Thereby, during assembling the rotor assembly the skewing may be obtained by rotating each magnetic component part by 180 deg compared to the neighbouring magnetic component parts within the same row.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

FIG. 1 shows a wind turbine according to an embodiment of the present invention.

FIG. 2a shows in a top view two rows of magnetic component parts, wherein each magnetic component part comprises a permanent magnet being positioned off center on a base element and wherein each base element is mounted to a support structure of a rotor assembly as shown in FIG. 1.

FIG. 2b shows in a cross sectional view two magnetic component parts as shown in FIG. 2a, which are engaged with a dove tail arrangement with the support structure of the rotor assembly shown in FIG. 1.

FIG. 2c shows in a perspective view the magnetic component parts arrangement as shown in FIG. 2a.

FIG. 3a shows in a top view two rows of magnetic component parts, wherein each magnetic component part comprises a mounting structure being positioned off center beneath a base element.

FIG. 3b shows in a cross sectional view two magnetic component parts as shown in FIG. 3a.

FIG. 3c shows in a perspective view the magnetic component parts arrangement as shown in FIG. 3a.

DETAILED DESCRIPTION

Figure 4A:
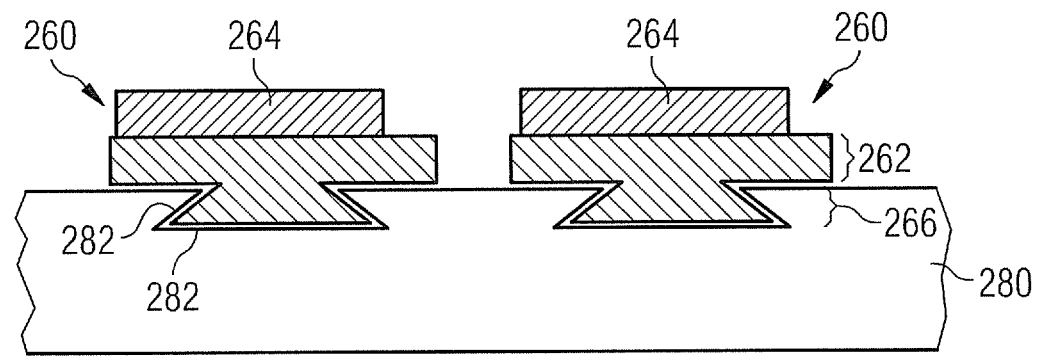
FIGS. 4a and 4b show an arrangement of two rows of magnetic component parts, which comprise permanent magnets having the shape of a parallelepiped, wherein a channel is formed in between the two rows.

The illustration in the drawing is schematically. It is noted that in different figures, similar or identical elements are provided with the same reference signs.

FIG. 1 shows a wind turbine 100 according to an embodiment of the invention. The wind turbine 100 comprises a tower 120, which is mounted on a non-depicted fundament. On top of the tower 120 there is arranged a nacelle 122. In between the tower 120 and the nacelle 122 there is provided a yaw angle adjustment device 121, which is capable of rotating the nacelle 122 around a non depicted vertical axis, which is aligned with the longitudinal extension of the tower 120. By controlling the yaw angle adjustment device 121 in an appropriate manner it can be made sure, that during a normal operation of the wind turbine 100 the nacelle 122 is always properly aligned with the current wind direction. However, the yaw angle adjustment device 121 can also be used to adjust the yaw angle to a position, wherein the nacelle 122 is intentionally not perfectly aligned with the current wind direction.

The wind turbine 100 further comprises a rotor 110 having three blades 114. In the perspective of FIG. 1 only two blades 114 are visible. The rotor 110 is rotatable around a rotational axis 110a. The blades 114, which are mounted at a hub 112, extend radially with respect to the rotational axis 110a.

In between the hub 112 and a blade 114 there is respectively provided a blade adjustment device 116 in order to adjust the blade pitch angle of each blade 114 by rotating the respective blade 114 around a non depicted axis being aligned substantially parallel with the longitudinal extension of the blade 114. By controlling the blade adjustment device 116 the blade pitch angle of the respective blade 114 can be adjusted in such a manner that at least when the wind is not so strong a maximum wind power can be retrieved from the available wind power. However, the blade pitch angle can also be intentionally adjusted to a position, in which only a reduced wind power can be captured.

As can be seen from FIG. 1, within the nacelle 122 there is provided a gear box 124. The gear box 124 is used to convert the number of revolutions of the rotor 110 into a higher number of revolutions of a shaft 125, which is coupled in a known manner to an electromechanical transducer 140. The electromechanical transducer is a generator 140.

Further, a brake 126 is provided in order to stop the operation of the wind turbine 100 or to reduce the rotational speed of the rotor 110 for instance (a) in case of an emergency, (b) in case of too strong wind conditions, which might harm the wind turbine 100, and/or (c) in case of an intentional saving of the consumed fatigue life time and/or the fatigue life time consumption rate of at least one structural component of the wind turbine 100.

The wind turbine 100 further comprises a control system 153 for operating the wind turbine 100 in a highly efficient manner. Apart from controlling for instance the yaw angle adjustment device 121 the depicted control system 153 is also used for adjusting the blade pitch angle of the rotor blades 114 in an optimized manner.

In accordance with basic principles of electrical engineering the generator 140 comprises a stator assembly 145 and a rotor assembly 150. The stator assembly 145 comprises a plurality of coils for generating electrical current in response to a time alternating magnetic flux. The rotor assembly comprises a plurality of permanent magnets, which are arranged in rows being aligned with a longitudinal axis of the rotor assembly 150. As will be described below in detail, the permanent magnets being assigned to one row are skewed with respect to each other in order to minimize a cogging torque when the generator 140 is in operation.

FIG. 2a shows in a top view two rows 271 and 272 of magnetic component parts 260, wherein each magnetic component part 260 comprises a permanent magnet 264 being positioned off center on a base element 262. Each base element 262 is mounted to a support structure 280 of a rotor assembly as shown in FIG. 1.

FIG. 2b shows in a cross sectional view two magnetic component parts 260 as shown in FIG. 2a. The cross section is taken along the line A-A shown in FIG. 1. As can be seen from FIG. 2b, each magnetic component part 260 comprises a base plate 262, a permanent magnet 264 being attached to the base plate 262 at a first surface and a mounting structure 266. The mounting structure 266 is fixed to the base plate 262 at a second surface being opposite to the first surface.

According to the embodiment described here, the mounting structure 266 is integrally formed with the base plate 262. Specifically, the mounting structure comprises a contour 266, which is adapted to engage with a complementary contour 282 of the support structure 280. As can be seen from FIG. 2b, the contour 266 and the complementary contour form dove tail arrangements.

FIG. 2c shows in a perspective view the magnetic component parts arrangement as shown in FIG. 2a.

As can be seen from FIGS. 2a, 2b and 2c, each permanent magnet 264 is positioned to the left or to the right on the base plate 262. Specifically, each permanent magnet 264 is positioned off center with respect to a central axis 266a of the respective mounting structure 266. The off center positioning of the permanent magnets 264 and a rotation of each magnetic component part 260 by 180 degree with respect to its neighboring magnetic component part 260 of the same row results in a desired skewing of the permanent magnets 264. This means that the position of the permanent magnets 264 change in an alternating manner in the axial direction of the rotor assembly.

It is mentioned that the permanent magnets 264 being assigned to the first row 271 may be oriented in opposite direction as compared to the permanent magnets 264 being assigned to the second row 272. Specifically, the permanent magnets 264 being assigned to the first row 271 may have their north (south) pole on the upper side, whereas the permanent magnets 264 being assigned to the second row 272 may have their south (pole) on the upper side.

FIG. 3a shows in a top view a permanent magnet arrangement according to another embodiment of the invention. The arrangement comprises again two rows 271 and 272 of magnetic component parts 260. FIG. 3b shows two magnetic component parts 260 of the arrangement in a cross sectional view along the line A-A depicted in FIG. 3a. FIG. 3c shows the arrangement in a perspective view.

The component parts 260 shown in FIGS. 3a, 3c and in particular in FIG. 3b differ from the component parts 260 shown in FIG. 2a, 2c and in particular in FIG. 2b in that, that the mounting structure 266 is positioned off center with respect to the permanent magnet 264. According to the embodiment described here the mounting structure 266 is also positioned off center with respect to the base plate 262. Further, the base plate 262 and the permanent magnet 264 are aligned with each other with respect to an axis being orientated parallel with the central axis 266 of the mounting structure 266.

As can be seen from FIGS. 3a and 3b, the mounting structure is a dove tail 266, which is positioned (off center) on the backside of the base plate 262 in such a way that a magnet skewing is obtained by rotating each magnetic component part 260 by 180 degrees compared to the neighbouring elements in the same row 271 or 272. As a result the position of the permanent magnets 264 changes in an alternating manner in the axial direction of the rotor.

Figure 4B:
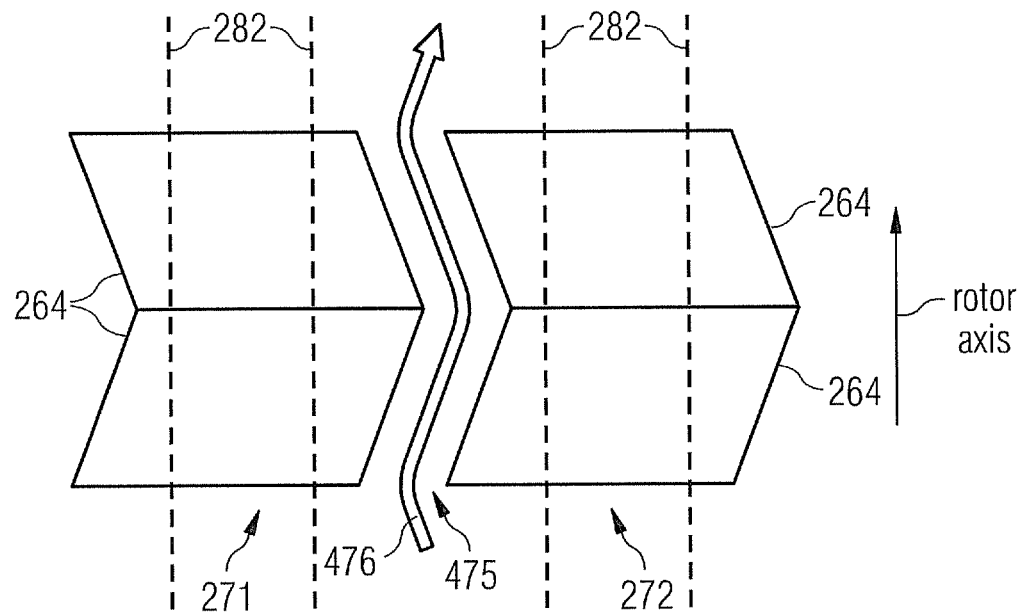

FIGS. 4a and 4b show in accordance with a further embodiment of the invention an arrangement of two rows 271 and 272 of magnetic component parts 260. Each magnetic component part 260 comprises a permanent magnet 264 having the shape of a parallelepiped. Again, the permanent magnet 264 is attached to a base plate 262 at an upper surface. A mounting structure 266 is fixed to the base plate 262 at a lower surface.

As can be seen in particular from FIG. 4a, in accordance with the embodiment shown in FIGS. 2a, 2b and 2c, the mounting structure 266 is a dove tail. The base plate 262 and the dove tail 266 are positioned symmetrically with respect to each other.

By contrast to the embodiments described above with reference to the FIGS. 2a-c and 3a-c, the parallelepiped shaped permanent magnet 264 is positioned on the base plate 262 in such a manner, that a first portion of the parallelepiped shaped permanent magnet 264 is positioned relatively to the left side of the base plate 262 and a second portion of the parallelepiped shaped permanent magnet 264 is positioned relatively to the left side of the base plate 262. Thereby, the first portion corresponds (a) to the lower portion of the two parallelepiped shaped permanent magnets 264, which in FIG. 4b are shown as the lower permanent magnets 264 or (b) to the upper portion of the two parallelepiped shaped permanent magnets 264, which in FIG. 4b are shown as the upper permanent magnets 264. Accordingly, the second portion corresponds (a) to the upper portion of the two parallelepiped shaped permanent magnets 264, which in FIG. 4b are shown as the lower permanent magnets 264 or (b) to the lower portion of the two parallelepiped shaped permanent magnets 264, which in FIG. 4b are shown as the upper permanent magnets 264. This embodiment may provide the advantage that cogging torque may even be further smoothed out.

Further, between the two rows 271 and 272 there is formed a channel or a duct 475, which has comparatively smooth side walls and which therefore allows an air stream 476 to flow without a large flow resistance in between the magnetic component parts being assigned to different rows 271, 272. As a consequence, a better cooling effect may be provided for a rotor assembly, which is equipped with the described arrangement of parallelepiped shaped permanent magnets 264.

In this respect it is mentioned that for realizing a continuous side surface of a plurality of permanent magnets 264, which are each formed in the shape of a parallelepiped, there may be required two types of magnetic component parts 260, which have to be arranged in the respective row 271, 272 in an alternating manner. Thereby, one type of magnetic component part 260 comprises a permanent magnet 264, which in a top view is inclined to the right (seen along the rotor axis as illustrated by the arrow) and the other type of magnetic component part comprises a permanent magnet, which in a top view is inclined to the left (seen along the rotor axis as illustrated by the arrow).

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A magnetic component part for a rotor assembly of an electromechanical transducer, the magnetic component part, comprising:
a base element including a first side and an opposing second side;
a permanent magnet, which is attached to the base element at the first side; and
a mounting structure, which is fixed to the base element at the second side and which is adapted to be mechanically connected to a support structure of the rotor assembly,
wherein the permanent magnet is located in an offset position with respect to a central axis of the mounting structure, which central axis extends from the mounting structure through the second side to the first side,
wherein the base element is a base plate, the first side is a first surface of the base plate and the second side is a second surface of the base plate.

2. The magnetic component part as claimed in claim 1, further comprising a glue, which is located at a boundary surface between the base element and the permanent magnet.

3. The magnetic component part as claimed in claim 1, wherein the mounting structure is integrally formed with the base element.

4. The magnetic component part as claimed in claim 1, wherein the mounting structure comprises a contour, which is adapted to engage with a complementary contour of the support structure.

5. The magnetic component part as claimed in claim 4, wherein the contour and/or the complementary contour is formed in a dove tail manner.

6. The magnetic component part as claimed in claim 1, wherein the permanent magnet comprises a shape of a parallelepiped.

7. The magnetic component part as claimed in claim 6, wherein the permanent magnet includes the shape of a right parallelepiped.

8. A rotor assembly for an electromechanical transducer, the rotor assembly comprising:
a rotor shaft including a longitudinal axis;
a first row of magnetic component parts, wherein the first row is aligned with the longitudinal axis and wherein the magnetic component parts of the first row are arranged in a first alternating orientation such that neighboring permanent magnets of the first row are skewed which respect to each other; and
a second row of magnetic component parts, wherein the second row is aligned with the longitudinal axis and wherein the magnetic component parts of the second row are arranged in a second alternating orientation such that neighboring permanent magnets of the second row are skewed which respect to each other,
wherein each magnetic component part, comprises:
a base element including a first side and an opposing second side;
a permanent magnet, which is attached to the base element at the first side; and a mounting structure, which is fixed to the base element at the second side and which is adapted to be mechanically connected to a support structure of the rotor assembly, wherein the permanent magnet is located in an offset position with respect to a central axis of the mounting structure, which central axis extends from the mounting structure through the second side to the first side, wherein the base element is a base plate, the first side is a first surface of the base plate and the second side is a second surface of the base plate.

9. The rotor assembly as claimed in claim 8, wherein the first row and the second row are spaced apart from each other in such a manner, that in between the first row and the second row a channel is formed.

10. The rotor assembly as claimed in claim 8, wherein the magnetic component part comprises a glue, which is located at a boundary surface between the base element and the permanent magnet.

11. The rotor assembly as claimed in claim 8, wherein the mounting structure is integrally formed with the base element.

12. The rotor assembly as claimed in claim 8, wherein the mounting structure comprises a contour, which is adapted to engage with a complementary contour of the support structure.

13. The rotor assembly as claimed in claim 12, wherein the contour and/or the complementary contour is formed in a dove tail manner.

14. The rotor assembly as claimed in claim 8, wherein the permanent magnet comprises a shape of a parallelepiped.

15. The rotor assembly as claimed in claim 14, wherein the permanent magnet includes the shape of a right parallelepiped.

16. A method for manufacturing a rotor assembly of an electromechanical transducer, the method comprising mounting at least four magnetic component parts to a mounting structure of the rotor assembly;

assigning at least two magnetic component parts to a first row;

aligning the first row with a longitudinal axis of the rotor assembly;

arranging the magnetic component parts of the first row in an alternating orientation such that neighboring permanent magnets of the first row are skewed which respect to each other, assigning at least two magnetic component parts to a second row;

aligning the second row with the longitudinal axis of the rotor assembly; and arranging the magnetic component parts of the second row in an alternating orientation such that neighboring permanent magnets of the second row are skewed which respect to each other, wherein each magnetic component part, comprising:
　a base element including a first side and an opposing second side;
　a permanent magnet, which is attached to the base element at the first side; and
　a mounting structure, which is fixed to the base element at the second side and which is adapted to be mechanically connected to a support structure of the rotor assembly, wherein the permanent magnet is located in an offset position with respect to a central axis of the mounting structure, which central axis extends from the mounting structure through the second side to the first side, wherein the base element is a base plate, the first side is a first surface of the base plate and the second side is a second surface of the base plate.

* * * * *